United States Patent [19]

Minami et al.

[11] Patent Number: 4,490,513

[45] Date of Patent: Dec. 25, 1984

[54] PROCESS FOR PRODUCING POLYMERS OR COPOLYMERS OF OLEFINS CONTAINING AT LEAST THREE CARBON ATOMS AND CATALYSTS THEREFOR

[75] Inventors: Syuji Minami, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 836,056

[22] Filed: Sep. 23, 1977

[30] Foreign Application Priority Data

Sep. 27, 1976 [JP] Japan .................................. 51/114631

[51] Int. Cl.³ .......................... C08F 4/02; C08F 10/00
[52] U.S. Cl. .................................... 526/128; 502/116; 526/125; 526/127; 526/351; 526/906
[58] Field of Search ........................ 252/429 B, 429 C; 526/128, 124, 125, 127

[56] References Cited

U.S. PATENT DOCUMENTS

| | | | |
|---|---|---|---|
| 3,907,759 | 9/1975 | Okada et al. | 526/128 |
| 4,069,169 | 1/1978 | Toyoda et al. | 252/429 C |
| 4,071,672 | 1/1978 | Kashiwa | 526/125 |
| 4,076,924 | 2/1978 | Toyota et al. | 526/125 |
| 4,107,414 | 8/1978 | Giannini et al. | 526/906 |
| 4,115,319 | 9/1978 | Scata et al. | 526/125 |

FOREIGN PATENT DOCUMENTS

| | | | |
|---|---|---|---|
| 1128090 | 9/1968 | United Kingdom | 526/142 |
| 1128724 | 10/1968 | United Kingdom | 526/142 |
| 1387890 | 3/1975 | United Kingdom | 526/125 |

*Primary Examiner*—Edward J. Smith
*Attorney, Agent, or Firm*—Sherman & Shalloway

[57] ABSTRACT

A process for producing a polymer or copolymer of an olefin containing at least 3 carbon atoms which comprises polymerizing or copolymerizing at least one olefin containing at least 3 carbon atoms, or copolymerizing the olefin with to 10 mole % of ethylene and/or a diolefin in the presence of a catalyst composed of (A) a magnesium-containing solid titanium catalyst component and (B) an organometallic compound of a metal of Groups I to III of the periodic table; wherein the solid titanium catalyst component (A) is a composition formed by contacting (i) a reaction product of an organic magnesium compound containing magnesium directly bonded to at least one carbon atom with an organic silicon-containing compound selected from the group consisting of organic silanols containing at least one hydroxyl group directly bonded to silicon and organopolysiloxanes, (ii) an organic acid ester, and (iii) a titanium compound.

7 Claims, No Drawings

PROCESS FOR PRODUCING POLYMERS OR COPOLYMERS OF OLEFINS CONTAINING AT LEAST THREE CARBON ATOMS AND CATALYSTS THEREFOR

This invention relates to a process for polymerizing or copolymerizing an olefin containing at least 3 carbon atoms which can afford a highly stereoregular polymer or copolymer in high yields while inhibiting the formation of undesirable very fine polymer particles.

Catalyst systems composed of solid titanium halides and organoaluminum compounds have previously been used for preparing highly stereoregular polymers of α-olefins. Polymerizations using these catalyst systems afford highly stereoregular polymers; but the yield of the polymer per unit amount of the titanium catalyst component is still low, and an additional step is required to remove the catalyst residue from the resulting polymer. Recently, some methods, for example, those disclosed in Japanese Laid-Open Patent Publications Nos. 16986/73, 16987/73 and 16988/73 (German OLS 2230728, 2230752, and 2230672), were proposed to remove the defects of the prior art techniques. These methods attempt to obtain highly stereoregular poly(α-olefins) by polymerizing α-olefins such as propylene using a catalyst comprising a solid component which is obtained by copulverizing a complex compound formed between a titanium halide and a specific electron donor together with an anhydrous magnesium halide, and the reaction product of a trialkyl aluminum and a specific electron donor. With these methods, however, the stereoregularity of the resulting polymer is still insufficient, and the yield of the polymer per titanium atom is still unsatisfactory. In addition, these methods still suffer from the defect that the yield of the polymer per chlorine atom in the catalyst is low; that the polymerization must be performed with a low slurry concentration because of the low apparent density of the resulting polymer, thus rendering the methods economically disadvantageous; and that the polymerization activity of the catalyst is lost within short periods of time.

French Laid-Open Patent Publication No. 2,113,313 (May 29, 1972) discloses a process for selectively preparing either an atactic polymer as a main product or a stereoregular polymer as a main product. This Patent Publication states that when a Ti catalyst component obtained by contacting a titanium compound with a mixture of an active-type magnesium halide carrier and an anhydrous compound of an element of Groups I to IV, for example, Si is used in the above process preferably in the form supported on a carrier and subsequently modified with an electron donor, a stereoregular polymer is obtained as a main product. This Publication, however, illustrates only $SiO_2$ as the anhydrous compound of Si. Furthermore, this Publication discloses that ethers, thioethers, amines, phosphines, ketones and esters can be utilized as the electron donors, but do not exemplify any specific compounds that fall within the esters. The isotacticity of the polymer expressed by its boiling n-heptane extraction residue in all of the Examples of the above Patent Publication is at most about 70%, and therefore, the process of this patent is far from satisfactory for preparing highly stereoregular polymers. On the other hand, the electron donor used in this patent for production of isotactic polymers is only N,N',N'',N'''-tetramethyl ethylene diamine. Moreover, only anhydrous lithium chloride and $SiO_2$ are specifically used in this patent as the anhydrous compound of an element of Groups I to IV.

Suggestions are also known of using a magnesium-containing solid titanium catalyst component obtained by reacting a reaction product formed between an organo-magnesium compound such as a Grignard reagent and an organopolysiloxane such as hydropolysiloxane or polysiloxane, with a halogen compound of titanium or vanadium (Japanese Laid-Open Patent Publications Nos. 11975/74, 133488/74, and 58189/74). In these suggestions, no description is made as to a catalyst component which will result from further reacting the aforesaid catalyst component with an organic acid ester. Moreover, the use of the aforesaid catalyst component is limited to the polymerization of ethylene, and the copolymerization of ethylene with not more than about 10% of another α-olefin such as propylene, butene-1 or hexene-1. These prior publications do not at all touch upon the stereoregularity required of polymers or copolymers of α-olefins containing at least 3 carbon atoms. Nor do they disclose the use of organic acid esters which are essential in the present invention to form the titanium catalyst component. Comparative Example 1 given hereinbelow show that even when propylene is polymerized using this titanium catalyst component which is formed in the absence of an organic acid ester, the improvement intended by this invention cannot be achieved.

The same co-inventors as the present ones, in an attempt to overcome the disadvantages described hereinabove with regard to French Laid-Open Patent Publication No. 2,113,313, already disclosed that a titanium-containing catalyst component composed of an organic complex derived from (i) a magnesium halide such as magnesium chloride, magnesium bromide or magnesium iodide, (ii) a specified Si compound, preferably an organic Si compound, especially preferably an organopolysiloxane, (iii) an organic carboxylic acid ester and (iv) a specified Ti compound, when combined with an organoaluminum compound, becomes a superior catalyst for preparation of highly stereoregular polyolefins (OLS No. 2504036). This publication discloses the utilization of the inorganic magnesium compounds, especially magnesium dihalides, and states that this magnesium compound is preferably dehydrated under reduced pressure, or pulverized and sieved to an average particle diameter of 1 to 50 microns, prior to use. The patent does not disclose anything about the utilizability of an organic magnesium compound which does not require such an operation or treatment. Nor does it suggest that the use of organic magnesium compounds would contribute further to the technology involving such a type of catalyst.

The present inventors have found that a magnesium-containing solid titanium catalyst component formed by contacting (i) a reaction product of an organic magnesium compound containing magnesium directly bonded to at least one carbon atom with an organic silicon-containing compound selected from the group consisting of organic silanols containing at least one hydroxyl group directly bonded to silicon and organopolysiloxanes, (ii) an organic acid ester and (iii) a titanium compound is useful for providing a superior catalyst for the polymerization or copolymerization of α-olefins containing at least 3 carbon atoms or the copolymerization of these olefins with up to 10 mole% of ethylene and/or a diolefin. It has also been found that the utilization of the magnesium-containing solid titanium catalyst component has the advantage of not requiring the operation or treatment performed at the time of using the magnesium halide as a carrier, and easily affords a catalyst having a good reproducibility of catalytic activity, and that it is useful for producing highly stereoregular polymers or copolymers of olefins with at least 3 carbon atoms in high yields. It was confirmed that the halogen content of the resulting polymer or copolymer ascribable to the catalyst can be reduced, and the specified magnesium-containing solid titanium catalyst component can further contribute to the technology of producing highly stereoregular polymers or copolymers of olefins having at least 3 carbon atoms. The inventors further found that the aforesaid catalyst is extremely useful for conveniently producing polymers or copolymers of olefins containing at least 3 carbon atoms which have a high apparent density and a reduced content of a fine powdery polymer or copolymer that causes handling disadvantage.

Accordingly, an object of this invention is to provide a process for preparing highly stereoregular polyolefins having the above-mentioned improved effects.

Another object of this invention is to provide a catalyst for use in the process of this invention.

Many other objects and advantages of this invention will become more apparent from the following description.

The polymerization or copolymerization of α-olefins having at least 3 carbon atoms, as referred to in this application, includes homopolymerizations of α-olefins having at least 3 carbon atoms, copolymerizations of at least two α-olefins having at least 3 carbon atoms with each other, and copolymerizations of α-olefins having at least 3 carbon atoms with ethylene and/or diolefins in an amount of up to 10 mol%.

Examples of the α-olefins are propylene, 1-butene, 4-methyl-1-pentene, and 3-methyl-1-butene, and examples of the diolefins include conjugated diolefins such as butadiene and non-conjugated dienes such as dicyclopentadiene, ethylidenenorbornene and 1,5-hexadiene.

The catalyst used in this invention is composed of (A) the magnesium-containing solid titanium catalyst component described hereinabove, and (B) an organo-metallic compound of a metal of Groups I to III of the periodic table.

As stated, component (A) is an organic complex derived from or formed by contacting (i) a reaction product of an organic magnesium compound containing magnesium directly bonded to at least one carbon atom with an organic silicon-containing compound selected from the group consisting of organic silanols containing at least one hydroxyl group directly bonded to silicon and organopolysiloxanes, (ii) an organic acid ester, and (iii) a titanium compound.

The organic magnesium compound is, for example, a compound of the formula

wherein R' represents a member of the group consisting of alkyl groups containing 1 to 10 carbon atoms, cycloalkyl groups containing 3 to 10 carbon atoms and aryl groups containing 6 to 12 carbon atoms, and R" represents a member of the group consisting of halogen atoms, alkyl groups containing 1 to 10 carbon atoms, cycloalkyl groups containing 3 to 10 carbon atoms and aryl groups containing 6 to 12 carbon atoms. Examples of such an organic magnesium compound are organic magnesium compounds broadly called Grignard reagents. Such compounds may also be used in the form of adducts with ethers such as tetrahydrofuran. They may not be in the form of ether adducts, and may be Grignard reagents synthesized in ordinary inert solvent solutions by the method disclosed in Journal of Chemical Society, 1961, p. 1175.

Specific examples of these organic magnesium compounds are halogen-containing organic magnesium compounds such as $CH_3MgCl$, $CH_3MgBr$, $CH_3MgI$; $C_2H_5MgCl$, $C_2H_5MgBr$, $C_2H_5MgI$; $C_3H_7MgCl$, $C_3H_7MgBr$, $C_3H_7MgI$; $C_4H_9MgCl$, $C_4H_9MgBr$, $C_4H_9MgI$; $C_5H_{11}MgCl$, $C_5H_{11}MgBr$, $C_5H_{11}MgI$; $C_6H_{13}MgCl$, $C_6H_{13}MgBr$, $C_6H_{13}MgI$; $C_7H_{15}MgBr$, $C_7H_{15}MgI$; $C_8H_{17}MgCl$, $C_8H_{17}MgBr$, $C_8H_{17}MgI$; $C_9H_{19}MgCl$, $C_9H_{19}MgBr$, $C_9H_{19}MgI$; $C_{10}H_{21}MgCl$; $C_6H_5MgCl$, $C_6H_5MgBr$, $C_6H_5MgI$; $CH_3(C_6H_4)MgCl$, $CH_3(C_6H_4)MgBr$, $CH_3(C_6H_4)MgI$, and halogen-free magnesium compounds such as $Mg(CH_3)_2$, $Mg(C_2H_5)_2$, $Mg(C_3H_7)_2$, $Mg(C_4H_9)_2$, $Mg(C_5H_{11})_2$, $Mg(C_6H_{13})_2$, $Mg(C_7H_{15})_2$, $Mg(CH_3)(C_2H_5)$, $Mg(C_2H_5)(C_3H_7)$, $Mg(CH_3)(C_4H_9)$, $Mg(C_2H_5)(C_4H_9)$, $Mg(C_6H_5)_2$, $Mg[CH_3(C_6H_4)]_2$, $Mg(C_2H_5)(C_6H_5)$, and $Mg(C_2H_5)[CH_3(C_6H_4)]$.

The organic magnesium compounds may contain other metals such as Al, Zn and B. These compounds can be synthesized by the method shown in Journal of Organo-metallic Chemistry, 1975, Vol. 93, page 1.

The organic silicon-containing compound to be reacted with the organic magnesium compound may, for example, be:

(a) organic silanols of the formula

wherein R''' is a member of the group consisting of hydrogen, vinyl, $C_1$–$C_4$ alkyl and phenyl optionally containing lower alkyl or halogen, l is 1, 2 or 3, and at least one R''' groups is other than hydrogen;

(b) organic aliphatic polysiloxanes of the formula

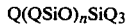

wherein each Q is a member of the group consisting of hydrogen, —OH, $C_1$–$C_4$ alkyl, $C_3$–$C_8$ cycloalkyl, $C_6$–$C_8$ aryl, $C_1$–$C_{12}$ alkoxy and phenoxy, n is an integer of 1 to 1000, and all Q groups are not hydrogen atoms or —OH at the same time; and (c) organic cyclopolysiloxanes of the formula

wherein Q and n are as defined hereinabove.

Specific examples of the organic silanol compounds (a) are silanols containing one hydroxyl group such as $(CH_3)_3SiOH$, $(CH_3)_2(C_2H_5)SiOH$, $(CH_3)_2(C_6H_5)SiOH$, $(C_2H_5)_3SiOH$, $(C_6H_5)_3SiOH$ and $(C_2H_5)_2HSiOH$; silanols containing two hydroxyl groups such as $(CH_3)_2Si(OH)_2$, $(CH_3)(C_6H_5)Si(OH)_2$, $(C_2H_5)_2Si(OH)_2$, $(C_2H_5)(C_6H_5)Si(OH)_2$, $(C_6H_5)_2Si(OH)_2$ and $(CH_3)(CH_2=CH)Si(OH)_2$; and silanols containing three hydroxyl groups such as $Cl_2C_6H_3Si(OH)_3$.

Specific examples of the organic aliphatic polysiloxane (b) are hexamethyl disiloxane, decamethyl tetrasiloxane, tetracosamethyl undecasiloxane, 3-hydroheptamethyl trisiloxane, 3,5-dihydrooctamethyl tetrasiloxane, 3,5,7-trihydrononamethyl pentasiloxane, tetramethyl-1,3-diphenyl disiloxane, pentamethyl-1,3,5-triphenyl trisiloxane, heptaphenyl disiloxane, octaphenyl trisiloxane, methyl polysiloxane, and phenylmethyl polysiloxane.

Examples of the organic cyclopolysiloxane (c) are 2,4,6-trimethyl cyclotrisiloxane, 2,4,6,8-tetramethyl cyclotetrasiloxane, hexamethyls cyclotrisiloxane, octamethyl cyclotetrasiloxane, decamethyl cyclopentasiloxane, dodecamethyl cyclohexasiloxane, triphenyl-1,3,5-trimethyl cyclotrisiloxane, hexaphenyl cyclotrisiloxane, and octaphenyl cyclotetrasiloxane.

If Q in the above formulae represents an organic group, it may have a substituent such as halogen or hydroxyl.

The reaction product (i) used to form the magnesium-containing solid titanium catalyst component (A) in this invention is a reaction product formed between the organic magnesium compound and organic silicon-containing compound exemplified hereinabove. Preferably, the mole ratio of the organic magnesium compound to the organic silicon-containing compound, in terms of Mg/Si, is about 0.1 to about 10.

Examples of the organic acid ester (ii), another component used to form the magnesium-containing solid titanium catalyst component (A), are organic aliphatic acid esters, organic alicyclic acid esters and organic aromatic acid esters.

Preferred examples of the organic acid ester (ii) include (a) esters formed between $C_1$–$C_{18}$, preferably $C_1$–$C_8$, more preferably $C_1$–$C_4$, saturated or unsaturated aliphatic carboxylic acids optionally substituted by halogen and alcohols selected from $C_1$–$C_{18}$, more preferably $C_1$–$C_4$, saturated or unsaturated aliphatic primary alcohols, $C_3$–$C_8$, preferably $C_5$–$C_6$, saturated or unsaturated alicyclic alcohols, $C_6$–$C_{10}$, preferably $C_6$–$C_8$, phenols and $C_1$–$C_4$ saturated or unsaturated aliphatic primary alcohols bonded to a $C_3$–$C_{10}$ aliphatic or aromatic ring;

(b) $C_3$–$C_{10}$ aliphatic lactones;

(c) carbonic acid esters;

(d) esters formed between $C_6$–$C_{12}$, preferably $C_6$–$C_8$, alicyclic carboxylic acids and $C_1$–$C_8$, preferably $C_1$–$C_4$, saturated or unsaturated aliphatic primary alcohols;

(e) Esters formed between $C_7$–$C_{18}$, preferably $C_7$–$C_{12}$, aromatic carboxylic acids and alcohols selected from $C_1$–$C_{18}$, preferably $C_1$–$C_8$, more preferably $C_1$–$C_4$, saturated or unsaturated aliphatic primary alcohols, $C_3$–$C_8$, preferably $C_6$–$C_8$, saturated or unsaturated alicyclic alcohols, $C_6$–$C_{10}$, preferably $C_6$–$C_8$, phenols and $C_1$–$C_4$ saturated or unsaturated aliphatic primary alcohols bonded to a $C_3$–$C_{10}$ aliphatic or aromatic ring;

(f) $C_8$–$C_{12}$ aromatic lactones; and (g) combinations of these esters.

Specific examples of the organic acid esters are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate and allyl acetate; primary alkyl esters of unsaturated fatty acids such as methyl acrylate, methyl methacrylate and n-butyl crotonate; esters of halogenated aliphatic monocarboxylic acids such as methyl chloroacetate and ethyl dichloroacetate; lactones such as propiolactone, γ-butyrolactone and δ-valerolactone; carbonic acid esters such as ethylene carbonate; and alicyclic acid esters such as methyl cyclohexanecarboxylate, ethyl cyclohexanecarboxylate, methyl methylcyclohexanecarboxylate and ethyl methylcyclohexanecarboxylate.

Specific examples of the aromatic acid esters which are the most preferred organic acid esters in this invention include (a) alkyl benzoates (where the alkyl group is a saturated or unsaturated hydrocarbon group containing usually 1 to 8 carbon atoms, preferably 1 to 4 carbon atoms) such as methyl benzoate, ethyl benzoate, n- or i-propyl benzoate, n-, i-, sec- or tert-butyl benzoate, n- or i-amyl benzoate, n-hexyl benzoate, n-octyl benzoate, 2-ethylhexyl benzoate, vinyl benzoate and allyl benzoate, the methyl and ethyl benzoates being preferred;

(b) cycloalkyl benzoates (where the cycloalkyl group is a nonaromatic cyclic hydrocarbon group containing usually 3 to 8 carbon atoms, preferably 5 or 6 carbon atoms) such as cyclopentyl benzoate and cyclohexyl benzoate;

(c) aryl benzoates (where the aryl group is a hydrocarbon group containing 6 to 10 carbon atoms, preferably 6 to 8 carbon atoms, to which ring may be bonded halogen and/or alkyl group usually containing 1 to 4 carbon atoms) such as phenyl benzoate, 4-tolyl benzoate, benzyl benzoate, styryl benzoate, 2-chlorophenyl benzoate and 4-chlorobenzyl benzoate;

(d) aromatic monocarboxylic acid esters in which an electron-donating substituent such as an alkoxy or alkyl group is bonded to the aromatic ring;

(e) alkoxybenzoic acid esters (where the alkyl group constituting the alkoxy group is an alkyl group usually containing 1 to 4 carbon atoms, preferably a methyl or ethyl group; and the alkyl group and the aryl group of the ester are as defined hereinabove) such as methyl anisate, ethyl anisate i-propyl anisate, i-butyl anisate, phenyl anisate, benzyl anisate, ethyl o-methoxybenzoate, methyl p-ethoxybenzoate, ethyl p-ethoxybenzoate, n-butyl p-ethoxybenzoate, ethyl p-allyloxybenzoate, phenyl p-ethoxybenzoate, methyl o-ethoxybenzoate, ethyl veratrate and ethyl asym-guaiacolcarboxylate;

(f) alkylbenzoic acid esters (wherein the alkyl group bonded to the aromatic ring of benzoic acid is a saturated or unsaturated hydrocarbon group containing usually 1 to 8 atoms, and the alkyl and aryl groups of the ester are as defined hereinabove) such as methyl p-toluate, ethyl p-toluate, i-propyl p-toluate, n- or i-amyl toluate, allyl p-toluate, phenyl p-toluate, 2-tolyl p-toluate, ethyl o-toluate, ethyl m-toluate, methyl p-ethylbenzoate, ethyl p-ethylbenzoate, sec-butyl p-ethylbenzoate, i-propyl o-ethylbenzoate, n-butyl m-ethylbenzoate, ethyl 3,5-xylenecarboxylate, and ethyl p-styrenecarboxylate;

(g) amino-containing benzoic acid esters such as methyl p-aminobenzoate and ethyl p-aminobenzoate;

(h) naphthoic acid esters such as methyl naphthoate, ethyl naphthoate, propyl naphthoate and butyl naphthoate; and (i) aromatic lactones such as coumarin and phthalide.

Preferred among these are esters of benzoic acid, alkylbenzoic acids and alkoxybenzoic acids. $C_1$–$C_4$ alkyl esters, especially methyl or ethyl esters, of benzoic acid, o- or p-toluic acid or p-anisic acid are especially preferred.

Preferred titanium compounds for use in the reaction of forming the catalyst component (A) are tetravalent titanium compounds of the formula $$Ti(OR)_g X_{4-g}$$

wherein R is a $C_1$-$C_6$ alkyl group or a $C_6$-$C_{12}$ aryl group, X represents a halogen atom such as Cl, Br or I, and $0 \leq g \leq 4$.

Specific examples of such a titanium compound are titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$, and $Ti(O\ iso\text{-}C_4H_9)Br_3$; alkoxytitanium dihalides such as $Ti(OCH_3)_2Cl_2$, $Ti(OC_2H_5)_2Cl_2$, $Ti(O\ n\text{-}C_4H_9)_2Cl$ and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxy titaniums such as $Ti(OCH_3)_4$, $Ti(OC_2H_5)_4$ and $Ti(O\ n\text{-}C_4H_9)_4$. The titanium tetrahalides are preferred, and titanium tetrachloride is most preferred.

The solid titanium catalyst component (A) of this invention is a reaction product obtained by contacting (i) the reaction product of the organic magnesium compound with the organic silicon-containing compound, (ii) the organic acid ester, and (iii) the titanium compound.

Various means of contacting are available for the preparation of component (A). Preferably, the reaction product (i) is first reacted with the organic acid ester (ii), and the reaction product is then reacted with (iii) the titanium compound.

The reaction product (i) can be formed by various means. The reaction may be carried out in an ether or an inert organic solvent such as heptane, hexane or kerosene. The organic magnesium compound may be synthesized prior to use. Or it may be formed in situ by causing metallic magnesium, a silicon-containing compound and an alkyl halide to be present in the reaction system of forming the reaction product (i). The reaction temperature is, for example, from room temperature to about 300° C., preferably, from about 30 minutes to about 10 hours. The molar ratio of the organic magnesium compound to the organic silicon-containing compound, which varies according to the types of these compounds, is preferably such that 0.1 to 10 atoms of silicon are used per atom of magnesium. When in the formation of the reaction product (i), the reaction product does not precipitate as a solid, the final reaction product can be obtained by removing the solvent by distillation during or after the reaction.

The chemical structure of the reaction product (i) of the organic magnesium compound with the organic silicon-containing compound has not been known in detail. The infrared absorption spectrum of the reaction product (i) shows a substantial disappearance of absorption bands of OH in silanol and the Si—O—Si bond of polysiloxane, and the appearance of new absorption bands between 800 and 1000 cm$^{-1}$. This fact demonstrates that the organic magnesium compound has reacted with the organic silicon-containing compound such as a silanol or polysiloxane. The appearance of the new absorption bands is due presumably to the formation of an Si—O—Mg band in the reaction product.

Preferred reaction products (i) are those in which the molar ratio of the organic magnesium compound to the organic silicon-containing compound in terms of Mg/Si is about 0.1 to about 10, and in their infrared absorption spectra, an Mg—C bond observed in the organic magnesium compound has disappeared substantially. These reaction products may contain other magnesium compounds. For example, they may contain small amounts of reaction products formed between organic magnesium compounds and electron donors, or magnesium halides.

In the formation of the solid titanium catalyst component (A) in the present invention, the contacting of the reaction product (i) with the organic acid ester (ii) is carried out preferably under mechanically copulverizing conditions. At this time, mechanical copulverization may be performed in the copresence of an inorganic or organic filler or a pulverizing aid. Examples of such additional agents are LiCl, $CaCO_3$, $CaCl_2$, $SrCl_2$, $BaCl_2$, $Na_2SO_4$, $Na_2CO_3$, $TiO_2$, $NaB_4O_7$, $Ca_3(PO_3)_2$, $CaSO_4$, $BaCO_3$, $Al_2(SO_4)_3$, $B_2O_3$, $Al_2O_3$, $SiO_2$, polyethylene, polypropylene, and polystyrene.

The copulverization treatment is performed by using a device such as a ball mill, vibratory mill or impact mill in the substantial absence of oxygen and water. The ratio between the reaction product (i) and the organic acid ester (ii) is such that the amount of the organic acid ester (ii) is preferably about 0.001 to about 10 molar times, more preferably about 0.01 to about 5 molar times, especially preferably about 0.01 to about 1 molar time, based on one atom of the magnesium in the reaction product (i). It is preferred to select the pulverizing conditions properly according, for example, to the types of the reaction product (i) and the organic acid ester (ii) or the pulverizing device. Generally, the pulverization time is about 1 hour to about 10 days, and the pulverization temperature is room temperature or its vicinity without any special need to cool or heat the pulverization system. In the case of, for example, a vibratory mill in which 2.8 kg of stainless steel (SUS 32) balls with a diameter of 15 mm are accomodated in a ball mill cylinder made of stainless steel (SUS 32) and having an inner capacity of 800 ml and an inside diameter of 100 mm and 20 to 40 g of the copulverizing materials are charged into it, the pulverization is preferably effected to an extent corresponding to a pulverization time of at least about 6 hours, preferably at least about 24 hours, at an impact acceleration of 7 G.

Various modes of operation can be employed to react the titanium compound (iii), another component for forming the solid titanium catalyst component (A) in this invention. For example, the reaction product (i) and the organic acid ester (ii) are mechanically copulverized in the presence of the titanium compound (iii) to contact the three under the mechanically pulverizing conditions; or the pulverized product obtained by the aforesaid mode is further contacted with the titanium compound; or the titanium compound (iii) is contacted in the absence of mechanical pulverization with the mechanically copulverized product of the reaction product (i) and the organic acid ester (ii).

When the contacting with the titanium compound is carried out under copulverizing conditions, it is also possible to use the titanium compound in the form of a complex with the organic acid ester. When the contacting with the titanium compound is performed under the cupulverizing conditions, the amount of the titanium compound used is preferably about 0.001 to about 10 atoms, more preferably about 0.01 to about 1 atom, per atom of magnesium. This pulverized product can be used as the solid catalyst component (A) with or without washing. Preferably, in the final stage of catalyst preparation, it is reacted with a liquid titanium compound in the absence of mechanical copulverization.

In reacting the titanium compound in the liquid phase in the absence of mechanical pulverization, it is preferred to suspend the pulverized product resulting from (i) and (ii), or the pulverized product resulting from (i), (ii) and (iii) in a liquid titanium compound such as titanium tetrachloride or in a solution of the titanium compound in an inert organic solvent such as hexane, heptane or kerosene. According to such a method, the small amounts of impurities occurring in the pulverizing step do not exert adverse effects, and the ratios of the raw materials can be varied widely.

The titanium compound is used preferably in such a proportion that the amount of titanium atom is about 0.001 to about 1000 atoms, especially at least about 0.05 atom, per atom of magnesium, although the amount may vary according to the amount of the organic acid ester used. There is no particular restriction on the temperature at which the liquid titanium compound is reacted in the absence of mechanical pulverization. But preferably the contacting is carried out usually at a temperature of about 20° to about 200° C. for at least about 0.5 hour.

When the contacting is effected under mechanically pulverizing conditions, the resulting catalyst component (A) is isolated by, for example, filtration, and is used for polymerization after it has been well washed with an inert organic solvent of the types exemplified hereinabove.

The contacting of the reaction product (i) containing magnesium and silicon with the organic acid ester (ii) can also be performed in an inert solvent, for example a hydrocarbon solvent such as hexane, heptane or kerosene, in the absence of mechanical pulverization.

When the materials (i) and (ii) are contacted in the absence of mechanical copulverization, the amount of the organic acid ester (ii) is preferably about 0.01 to about 1 mole, per mole of magnesium in the reaction product (i). The reaction at this time is sufficient if it is performed at a reaction temperature of room temperature to about 200° C. for about 5 minutes to about 2 hours.

After the reaction, the reaction mixture is filtered or evaporated, and washed with an inert solvent to isolate the final product desired. The reaction of the reaction product with the titanium compound can be performed substantially in accordance with the method of reaction between the copulverized product and the titanium compound described hereinabove.

The solid titanium catalyst component (A) obtained by this invention preferably has a typical composition which comprises about 1.0 to 6.0% by weight of titanium, 10.0 to 20.0% by weight of magnesium, 40 to 70% by weight of halogen, and 5.0 to 15.0% by weight of the organic acid ester. The composition does not substantially change upon washing with hexane at room temperature.

The component (A) has a surface area of usually at least 10 m$^2$/g, preferably at least 50 m$^2$/g.

The organometallic compound of a metal of Groups I to III of the periodic table used as catalyst component (B) contains a hydrocarbon group directly attached to a metal, and the use of organoaluminum compounds is preferred. Examples of such organometallic compounds are those of the general formula $R'_m Al(OR')_{3-m}$ wherein R' is an alkyl group, preferably a $C_1$–$C_4$ straight-chain or branched-chain alkyl group, the two or more R' groups being identical or different, and m is a number in the range of $1.5 \leq m \leq 3$; for example alkyl aluminum compounds, alkyl aluminum alkoxides, alkyl aluminum hydrides, alkyl aluminum halides, dialkyl zincs, and dialkyl magnesiums. Examples of preferred organoaluminum compounds include trialkyl or trialkenyl aluminums such as $Al(C_2H_5)_3$, $Al(CH_3)_3$, $Al(C_3H_7)_3$, $Al(C_4H_9)_3$ and $Al(C_{12}H_{25})_3$; alkyl aluminum compounds in which a plurality of Al atoms are connected via an oxygen or nitrogen atom, such as $(C_2H_5)_2AlOAl(C_2H_5)_2$, $(C_4H_9)_2AlOAl(C_4H_9)_2$ or

dialkyl aluminum hydrides such as $(C_2H_5)_2AlH$ and $(C_4H_9)_2AlCl$; and dialkyl aluminum alkoxides or phenoxides such as $(C_2H_5)_2Al(OC_2H_5)$ and $(C_2H_5)_2Al(OC_6H_5)$.

Of these, trialkyl aluminum is most preferred.

In accordance with this invention, olefins containing at least 3 carbon atoms can be polymerized, or copolymerized with each other or with up to 10 mole% of ethylene and/or diolefins in the presence of a catalyst composed of (A) the magnesium-containing solid titanium catalyst component and (B) the organometallic compound of a metal of Groups I to III of the periodic table. Preferably, polymerization temperatures of from room temperature to about 200° C., more preferably about 50° to about 180° C., and pressures of from atmospheric pressure to about 50 kg/cm$^2$, more preferably about 2 to about 20 kg/cm$^2$, are used. The polymerizations or copolymerizations can be performed either in the presence or in the absence of an inert liquid medium. Examples of the liquid medium are pentane, hexane, heptane, iso-octane and kerosene. In the absence of the liquid medium, the polymerization or copolymerization may be performed in the presence of a liquid olefin monomer, or it may be carried out in the vapor phase, for example, by using a fluidized bed catalyst.

The polymerization can be performed either batchwise, semi-continuously, or continuously. It is also possible to perform the polymerization in two or more stages having different reaction conditions.

The concentration of the catalyst to be fed into the polymerization system can be changed as desired. For example, in liquid-phase polymerization, the solid catalyst component (A) is used in a concentration of usually 0.001 to 0.5 millimole/liter of liquid medium calculated as titanium atom, and the catalyst component (B) is used in a concentration of usually 0.1 to 50 millimoles/liter of liquid medium calculated as metal atom. The ratio of Al or other metal atom to Ti atom is preferably 1:1 to 100:1, more preferably 1:1 to 30:1. In vapor-phase polymerization, the solid catalyst component (A) can be used in a concentration of 0.001 to 0.5 millimole (calculated as titanium atom), and the catalyst component (B), in an amount of 0.01 to 5 millimoles (calculated as aluminum or other metal atom), both per liter of the volume of the reaction zone.

Hydrogen may be caused to be present in the polymerization system to reduce the molecular weight of the resulting polymer (to increase the melt index of the polymer).

For the control of the stereoregularity of $\alpha$-olefins containing at least 3 carbon atoms, ethers, ethylene glycol derivatives, amines, amides, sulfur-containing compounds, nitriles, esters, carboxylic acids, acid amides, oxy acids, keto acids, acid anhydrides, acid halides, amino acids, etc. may be caused to be present in the polymerization system. Of these, the organic acid esters, above all aromatic carboxylic acid esters, are preferred. Such an aromatic carboxylic acid ester can be chosen from those exemplified hereinabove for use in the preparation of the solid catalyst component (A). Especially preferred esters are benzoic acid esters and nuclearly substituted benzoic acid esters such as toluates, anisates, diphthalates, diterephthalates, hydroxybenzoates, and aminobenzoates. Most preferred are methyl p-toluate and ethyl p-toluate.

These stereoregularity controlling agents may be used in the form of adducts with the organometallic compound (B). The effective amount of the stereoregularity controlling agent is usually about 0.001 to about 10 moles, preferably about 0.01 to about 2 moles, especially preferably about 0.1 to about 1 mole, per mole of the organometallic compound (B).

The following Examples and Comparative Example illustrate the present invention more specifically.

EXAMPLE 1

A commercially available Grignard reagent, $C_2H_5MgCl$ (in tetrahydrofuran, 2 moles/liter; 50 ml), was suspended in 300 ml of purified kerosene, and 14.8 g of Toshiba Silicone TSF-451 (methyl polysiloxane, 20 centistokes) was added. The reaction solution was heated to 200° C., and reacted for 30 minutes to afford a white solid. The solid was collected by filtration, washed with hexane, and dried. Then, 15 g of the compound, and 2 ml of ethyl benzoate were charged in an atomosphere of nitrogen into a stainless steel ball mill cylinder having an inner capacity of 800 ml and an inside diameter of 100 mm and having accomodated therein 100 stainless steel (SUS 32) balls with a diameter of 15 mm, and they were contacted for 100 hours at a rotating speed of 125 rpm.

The treated solid product was suspended in 300 ml of titanium tetrachloride, and the suspension was stirred at 80° C. for 2 hours. After the reaction, the solid portion was collected by filtration and well washed with hexane to afford a titanium-containing solid catalyst component which contained 2.5% by weight of titanium, 56% by weight of chlorine, 8.5% by weight of magnesium and 8.2% by weight of ethyl benzoate.

A 2-liter autoclave was charged with 750 ml of hexane which had been sufficiently freed of oxygen and water, and in an atmosphere of propylene at 40° C., 5.0 millimoles of triethyl aluminum and 1.59 millimoles of methyl p-toluate were fed into the autoclave. Five minutes later, the titanium-containing solid catalyst component was fed into the autoclave in an amount of 0.03 millimole calculated as titanium atom. The polymerization system was heated to 60° C., and the total pressure was elevated to 7.0 kg/cm$^2$ by propylene. Subsequently, 400 ml of hydrogen was introduced, and propylene was polymerized for 4 hours.

After the polymerization, the solid was collected by filtration to afford 125 g of polypropylene as a white powder which had a boiling n-heptane extraction residue of 95.8%, a bulk density of 0.38 and a melt inded of 6.0. The particle diameter distribution of the powder was such that 90% of it consists of particles having a diameter of at least 74 microns.

Concentrating the liquid portion afforded 8.3 g of a solvent-soluble polymer.

EXAMPLES 2 TO 5

The procedure of Example 1 was repeated except that in catalyst preparation, each of the polysiloxanes indicated in Table 1 was used instead of Toshiba Silicone TSF-451.

The results are shown in Table 1.

TABLE 1

| | Titanium-containing solid catalyst component | | | | | | Results of polymerization | | | | |
|---|---|---|---|---|---|---|---|---|---|---|---|
| | Silicon-containing compound | | Analysis (wt. %) | | | | | Boiling n-heptane extraction residue (g) | Soluble polymer (g) | Melt index | Bulk density (g/ml) | Powder of above 74 microns |
| Example | Type | Amount (g) | Ti | Cl | Mg | Ester | Powdery solid (g) | | | | | |
| 2 | Toshiba Silicone YF-37 (*1) | 21.4 | 3.9 | 57 | 13 | 9.8 | 112 | 94.7 | 7.8 | 5.8 | 0.37 | 91 |
| 3 | Toshiba Silicone TSF-433 (*2) | 13.6 | 4.0 | 55 | 11 | 8.7 | 133 | 95.6 | 8.0 | 5.5 | 0.36 | 93 |
| 4 | Toshiba Silicone TSF-431 (*3) | 27.2 | 2.8 | 58 | 12 | 12.5 | 124 | 94.3 | 6.4 | 6.0 | 0.37 | 90 |
| 5 | Toshiba Silicone TSF-484 (*4) | 12.0 | 3.4 | 55 | 12 | 10.3 | 139 | 95.0 | 6.7 | 5.3 | 0.38 | 89 |

(*1): Fatty acid-modified siloxane (20 centistokes)
(*2): Methylphenyl siloxane (400 centistokes)
(*3): Methylphenyl siloxane (100 centistokes)
(*4): Methyl hydrogen siloxane (20 centistokes)

EXAMPLE 6

Diphenyl silane diol (22.4 g) synthesized by hydrolyzing diphenyl dichlorosilane was suspended in 200 ml of toluene, and 104 ml of a 2M/l tetrahydrofuran solution of ethylmagnesium chloride was added dropwise. Because a vigorous exotherm occurred upon addition, the mixture was cooled with ice to maintain it at room temperature. After the addition, a reflux condenser was fitted to the reactor, and the reaction was performed at 65° C. for 1 hour. After the reaction, the solvent was removed by distillation to afford a white solid.

In 200 ml of kerosene was suspended 16.6 g of the above solid, and 2 ml of ethyl benzoate was added and reacted at 80° C. for 2 hours. The resulting solid was collected by filtration, washed with hexane, dried, and then again suspended in 200 ml of titanium tetrachloride. The reaction was performed at 80° C. for 2 hours with stirring. After the reaction, the solid portion was collected by filtration, and washed thoroughly with hexane to afford a titanium-containing solid catalyst component having 3.6% by weight of titanium, 58% by weight of chlorine, 17% by weight of magnesium and 6.5% by weight of ethyl benzoate.

Propylene was polymerized in the same way as in Example 1 except that the titanium-containing solid catalyst component was used in an amount of 0.03 millimole as titanium atom. There was obtained 133 g of polypropylene as a white powder. The polymer had a boiling n-heptane extraction residue of 94.2%, a bulk density of 0.37 and a melt index of 5.3. The particle diameter distribution of the polymer was such that 88% of it consisted of particles having a particle diameter of at least 74 microns.

Concentrating the liquid portion yielded 9.5 g of a solvent-soluble polymer.

EXAMPLE 7

Twenty grams of Toray Silicone SH-6018 (hydroxyl-containing siloxane having an average molecular weight of 1,600 and a hydroxyl content of 6.0% by weight) was suspended in 100 ml of hexane. The suspension was heated to 60° C., and 23 ml of a 2M/l tetrahydrofuran solution of n-butylmagnesium chloride was added dropwise over the course of 30 minutes and reacted at this temperature for 1 hour. After the reaction, the solid portion was collected by filtration at room temperature. The resulting solid was suspended in 300 ml of kerosene, and 3 ml of ethyl benzoate was added and reacted at 80° C. for 1 hour. The reaction product was collected by filtration, washed with hexane, dried, and then suspended in 150 ml of titanium tetrachloride. It was thus reacted with the titanium tetrachloride at 120° C. for 2 hours. The resulting solid portion was collected by filtration, washed with hexane, and dried to afford a titanium-containing solid catalyst component which contained 5.0% by weight of titanium, 56% by weight of chlorine, 12% by weight of magnesium, and 4.4% by weight of ethyl benzoate.

Propylene was polymerized in the same way as in Example 1 except that the titanium-containing solid catalyst component was used in an amount of 0.03 millimole as titanium atom. There was obtained 127 g of polypropylene as a white powder. The polymer had a boiling n-heptane extraction residue of 95.3%, a bulk density of 0.36 and a melt index of 5.7. The particle diameter distribution of the powder was such that 91% of it consisted of particles having a particle diameter of at least 74 microns.

Concentrating the liquid portion gave 7.9 g of a solvent-soluble polymer.

EXAMPLES 8 TO 11

A titanium-containing solid catalyst component was synthesized and propylene was polymerized in the same way as in Example 1 except that in catalyst preparation, each of the organic esters shown in Table 2 was used instead of the ethyl benzoate. The results are shown in Table 2.

TABLE 2

| | Titanium-containing solid catalyst | | | | Results of polymerization | | | | |
|---|---|---|---|---|---|---|---|---|---|
| | Organic acid ester | | Amount supported | | Solid powder (g) | Boiling n-heptane extraction residue (%) | Soluble polymer (g) | Melt index | Bulk density (g/ml) | Particles with a diameter of at least 74 microns (%) |
| Example | Type | Amount (ml) | Ti (wt. %) | Cl (wt. %) | | | | | | |
| 8 | Methyl benzoate | 2 | 2.7 | 56 | 132 | 95.2 | 7.6 | 5.7 | 0.37 | 87 |
| 9 | Ethyl p-toluate | 2 | 2.6 | 57 | 126 | 94.8 | 8.7 | 5.6 | 0.34 | 88 |
| 10 | Ethyl anisate | 2 | 2.5 | 56 | 115 | 93.9 | 5.2 | 7.8 | 0.33 | 90 |
| 11 | i-Propyl benzoate | 2 | 2.7 | 58 | 127 | 94.0 | 6.3 | 6.3 | 0.35 | 89 |

EXAMPLE 12

To 100 millimoles of trimethylhydroxy silane was added dropwise 50 ml of a 2M/l tetrahydrofuran solution of n-butylmagnesium chloride synthesized from metallic magnesium and n-butyl chloride, while maintaining the reaction mixture at room temperature. After the addition, the reaction mixture was reacted under reflux for 1 hour at the boiling point of tetrahydrofuran. After the reaction, the tetrahydrofuran was removed by distillation, and the residue was dried to afford a white powder.

Contacting in a rotary ball mill was performed in the same way as in Example 1 using 10 g of the resulting white solid and 1.5 ml of methyl benzoate. The treated solid product was suspended in 200 ml of titanium tetrachloride, and reacted at 80° C. for 2 hours with stirring. After the reaction, the solid portion was collected by filtration, and washed thoroughly with hexane to afford a titanium-containing solid catalyst component which contained 2.1% by weight of titanium and 95% by weight of chlorine.

Propylene was polymerized in the same way as in Example 1 except that 0.03 millimole, calculated as titanium atom, of the resulting titanium-containing solid catalyst component was used. There was obtained 120 g of polypropylene as a white powder. The polymer had a boiling n-heptane extraction residue of 93.8%, a bulk density of 0.36 and a melt index of 7.6. The particle diameter distribution of the powder was such that 90% of it consisted of particles having a diameter of at least 74 microns.

Concentrating the liquid portion yielded 8.9 g of a solvent-soluble polymer.

EXAMPLE 13

A white solid was synthesized in the same way as in Example 6 except that 52 millimoles of $(n-C_4H_9)_2 \cdot Mg$ was used instead of the ethylmagnesium chloride.

A titanium-containing solid catalyst component was prepared by rotating contacting in the same way as in Example 1 except that 15 g of the white solid and 2 ml of ethyl benzoate were used. The catalyst component obtained contained 2.9% by weight of titanium and 57% by weight of chlorine.

Propylene was polymerized in the same way as in Example 1 except that the titanium-containing solid catalyst component was used in an amount of 0.03 millimole calculated as titanium atom. There was obtained 98 g of polypropylene as a white powder. The polymer had a boiling n-heptane extraction residue of 94.7%, a bulk density of 0.35 and a melt index of 6.2. The particle diameter distribution of the powder was such that 87% of it consisted of particles having a particle diameter of at least 74 microns.

Concentrating the liquid portion yielded 6.4 g of a solvent-soluble polymer.

COMPARATIVE EXAMPLE 1

Fifteen grams of the white solid obtained in Example 1 (the reaction product between ethylmagnesium chloride and Toshiba Silicone TSF-451), without reacting with an organic acid ester, was suspended in 300 ml of titanium tetrachloride, and reacted at 130° C. for 2 hours. After the reaction, the solid portion was collected by filtration while the reaction mixture was still hot. The solid was thoroughly washed with purified hexane to afford a titanium-containing solid catalyst component which contained 3.9% by weight of titanium and 59% by weight of chlorine.

A 2-liter autoclave was charged with 750 ml of kexane which has been sufficiently deprived of oxygen and moisture, and 2 millimoles of triethyl aluminum and 0.03 millimole, calculated as titanium atom, of the resulting titanium-containing solid catalyst component were fed into the autoclave in an atmosphere of propylene at 40° C. The polymerization system was heated to 60° C., and the total pressure was raised to 6.0 kg/cm² using propylene. Subsequently, 300 ml of hydrogen was introduced, and propylene was polymerized for 2 hours.

After the polymerization, attempt was made to collect a solid material, but failed because the entire polymerization mixture was rubbery polypropylene. Precipitation with methanol afforded 38.1 g of rubbery polypropylene having a boiling n-heptane extraction residue of 40.1%, which showed markedly low stereoregularity.

What we claim is:

1. A process for producing a polymer or copolymer of an olefin containing at least 3 carbon atoms, which comprises polymerizing or copolymerizing at least one olefin containing at least 3 carbon atoms, or copolymerizing the olefin with up to 10 mole% of ethylene and/or a diolefin in the presence of hydrogen and a catalyst composed of:

(A) a magnesium-containing solid titanium catalyst component and (B) an organoaluminum compound, wherein the solid titanium catalyst component (A) is a composition formed by contacting the below defined organic magnesium compound (i) and organic acid ester (ii) or organic magnesium compound (i), organic acid ester (ii) and tetravalent titanium compound (iii), then contacting the resultant product with titanium tetrachloride or a solution of the titanium compound in an inert organic solvent in the absence of mechanical pulverization:

(i) a reaction product of an organic magnesium compound having the formula $$R'-Mg-R''$$

wherein R' is a member selected from the group consisting of alkyl groups containing 1 to 10 carbon atoms, cycloalkyl groups containing 3 to 10 carbon atoms, and aryl groups containing 6 to 12 carbon atoms, and R'' is a member selected from the group consisting of halogen atoms and alkyl groups containing 1 to 10 carbon atoms, or its ether adduct, with an organic silicon-containing compound selected from the group consisting of organic silanols containing at least one hydroxyl group directly bonded to silicon and having the formula $$[R'''_{l}SiOH_{4-l}]R_{x}Si(OH)_{4-x};$$

wherein R''' is a member selected from the group consisting of $C_1$-$C_4$ alkyl, and phenyl and x is 1, 2 or 3;

organic aliphatic polysiloxanes of the formula $$Q(Q_2SiO)_nSiQ_3$$

wherein each Q is a member of the group consisting of hydrogen —OH, $C_1$-$C_4$ alkyl, $C_6$-$C_8$ aryl and $C_1$-$C_{12}$ alkoxy, n is an integer of 1 to 1000, and all Q groups are not hydrogen atoms or —OH at the same time, organic cyclopolysiloxanes of the formula $$(Q'_2SiO)_{n'}$$

wherein Q' is an alkyl group containing 1 to 4 carbon atoms and n' is an integer of 3 to 6, at a molar ratio of the organic magnesium compound to the organic silicon-containing compound, in terms of Mg/Si, of about 0.1 to about 10, (ii) an organic acid ester selected from the group consisting of (a) esters formed between $C_1$-$C_{18}$ saturated or unsaturated aliphatic carboxylic acids optionally substituted by halogen and alcohols selected from $C_1$-$C_{18}$ saturated or unsaturated aliphatic primary alcohols;

(b) esters formed between $C_6$-$C_{12}$ alicyclic carboxylic acids and $C_1$-$C_8$ saturated or unsaturated aliphatic primary alcohols;

(c) aromatic acid esters selected from the group consisting of alkyl benzoates wherein the alkyl group is a $C_1$-$C_8$ saturated or unsaturated aliphatic hydrocarbon group, cycloalkyl benzoates wherein the cycloalkyl group is a $C_5$-$C_6$ cyclic hydrocarbon group, aryl benzoates wherein the aryl group is a $C_6$-$C_8$ aryl group, alkoxybenzoic acid esters wherein the alkoxy group is a $C_1$-$C_4$ alkoxy group and alkylbenzoic acid esters wherein the alkyl group is a $C_1$-$C_8$ alkyl group;

(d) mixtures of any of these esters, and (iii) a tetravalent titanium compound of the formula $$Ti(OR)_gX_{4-g}$$

wherein R represents a $C_1$–$C_6$ alkyl group or a $C_6$–$C_{12}$ aryl group, X represents a halogen atom, and $0 \leq g \leq 4$,
wherein the amount of the organic acid ester (ii) is about 0.01 to about 1 mole per mole of magnesium in the reaction product (i); wherein in liquid-phase polymerization, the amount of the catalyst is such that the preparation of the titanium catalyst component (A) is 0.001 to 0.5 millimole/liter, calculated as titanium atom, based on the volume of the liquid phase of the polymerization system, and the proportion of the organoaluminum compound (B) is 0.1 to 50 millimoles/liter, calculated as the aluminum atom, based on the volume of the liquid phase of the polymerization system; and in vapor-phase polymerization, the amount of the catalyst is such that the proportion of the titanium catalyst component (A) is 0.001 to 0.5 millimole/liter, calculated as titanium atom, based on the volume of the reaction zone, and the proportion of the organoaluminum compound (B) is 0.01 to 5 millimole/liter, calculated as aluminum atom, based on the volume of the reaction zone; and in the co-presence of an additional organic acid ester in an amount of about 0.1 to about 1 mole per mole of the organoaluminum compound (B).

2. The process of claim 1 wherein the tetravalent titanium compound (iii) is a titanium compound of the formula $$TiX_4$$

wherein X represents a halogen atom.

3. The process of claim 1 wherein the organic silicon-containing compound is the compound of formula $$R'''_x Si(OH)_{4-x}.$$

4. The process of claim 1 wherein the organic silicon-containing compound is the compound of formula $$Q(Q_2SiO)_n SiQ_3.$$

5. The process of claim 1 wherein the organic silicon-containing compound is the compound of formula $$(Q'_2SiO)_n.$$

6. A process for polymerizing an alpha-olefin having at least 3 carbon atoms comprising contacting said olefin with a catalyst prepared by mixing (A) an organoaluminum compound with (B) a solid titanium containing composition and (C) a carboxylic acid ester, said solid titanium composition being prepared by (1) reacting an organomagnesium compound having the formula R—Mg—X wherein R is hydrocarbon and X is halogen with an organic silicon-containing compound selected from the group consisting of $R_nSi(OH)_{4-n}$ wherein n is 1, 2 or 3 and $(R_2SiO)_m$ wherein m is more than 2, at a molar ratio of Mg/Si of 0.1/1 to 10/1, and then reacting the reaction product of (1) with (2), carboxylic acid ester at a molar ratio of ester/Mg of 0.01/1 to 1/1, and (3) reacting the reaction product of (2) in a hydrocarbon solvent with a titanium tetrahalide at a ratio of Ti/Mg of 0.1/1 to 50/1, the amount of Ti in composition (B) being about 1 to 6% by weight.

7. A process for polymerizing an alpha-olefin having at least 3 carbon atoms comprising contacting said olefin with a catalyst prepared by mixing (A) an organoaluminum compound with (B) a solid titanium containing composition and (C) an aromatic carboxylic acid ester, said solid titanium composition being prepared by (1) reacting an organomagnesium compound having the formula R'—Mg—R" wherein R' is alkyl, cycloalkyl or aryl and R" is halogen with an organic silicon-containing compound selected from the group consisting of organic silanols of the formula $R'''_x Si(OH)_{4-x}$ wherein R''' is hydrogen, vinyl, alkyl or phenyl wherein the phenyl may be substituted by lower alkyl or halogen, and at least one R''' group is other than hydrogen and x is 1, 2 or 3; and organic cyclopolysiloxanes of the formula $(Q_2SiO)_n$ wherein Q is hydrogen, hydroxyl, alkyl, cycloalkyl, aryl, alkoxy or phenoxy, wherein not all Q groups are hydrogen atoms or hydroxyl groups at the same time and n is an integer of 1 to 1,000, at a molar ratio of Mg/Si of 0.1/1 to 10/1 and then reacting the reacting of product (1) with (2) carboxylic acid ester at a molar ratio of ester/Mg of 0.01/1 to 1/1 and (3) reacting the reaction product of (2) in the hydrocarbon solvent with a titanium tetrahalide at a ratio of Ti/Mg of 0.05/1 to 1,000/1, the amount of Ti in composition (B) being about 1 to 6% by weight.

* * * * *

UNITED STATES PATENT AND TRADEMARK OFFICE
CERTIFICATE OF CORRECTION

PATENT NO. : 4,490,513
DATED : December 25, 1984
INVENTOR(S) : Syuji Minami; Akinori Toyota; Norio Kashiwa It is certified that error appears in the above-identified patent and that said Letters Patent is hereby corrected as shown below:

Claim 1, column 17, line 7, delete "prepa-" and insert -- proportion --.

line 8, delete "ration".

Signed and Sealed this

Fourteenth Day of May 1985

[SEAL]

Attest:

DONALD J. QUIGG

Attesting Officer    Acting Commissioner of Patents and Trademarks